United States Patent [19]

Bradley et al.

[11] Patent Number: 5,098,620

[45] Date of Patent: Mar. 24, 1992

[54] METHOD OF INJECTION MOLDING CERAMIC GREENWARD COMPOSITES WITHOUT KNIT LINES

[75] Inventors: Norbert L. Bradley, Sanford; Virgil W. Coomer, Shepherd, both of Mich.

[73] Assignee: The Dow Chemical Company, Midland, Mich.

[21] Appl. No.: 534,821

[22] Filed: Jun. 7, 1990

[51] Int. Cl.⁵ .................... B22F 3/02; C04B 33/28
[52] U.S. Cl. .................................. 264/26; 264/63; 264/86; 264/313; 264/317; 264/328.2; 264/517; 419/36; 419/37; 419/40; 419/44; 419/65
[58] Field of Search ............... 264/86, 63, 313, 317, 264/517, 328.2, 26; 419/36, 37, 40, 44, 65

[56] References Cited

U.S. PATENT DOCUMENTS

| | | |
|---|---|---|
| 1,863,854 | 6/1932 | Jeffrey. |
| 2,513,785 | 7/1950 | Browne .................... 264/517 |
| 2,783,521 | 3/1952 | Vondrous et al. . |
| 2,893,102 | 7/1959 | Maxwell . |
| 4,031,176 | 6/1977 | Molbert . |
| 4,269,890 | 5/1981 | Breitling et al. . |
| 4,582,682 | 4/1986 | Betz ........................ 264/104 |
| 4,612,163 | 9/1986 | Nishio et al. ............. 264/DIG. 78 |
| 4,761,264 | 8/1988 | Nishio et al. . |
| 4,822,692 | 4/1989 | Koehler . |
| 4,927,600 | 5/1990 | Miyashita ................ 264/313 |

Primary Examiner—James Derrington

[57] ABSTRACT

A method and apparatus for injection molding of ceramic suspension is disclosed wherein an elastomeric bladder is disposed within a mold cavity of a mold. The elastomeric bladder, in a relaxed state, can be tubular or can be formed by bonding together sheets of material. A ceramic suspension is injected into the elastomeric bladder, whereby the elastomeric bladder is distended. Distention of the elastomeric bladder applied a significant force to the ceramic suspension for preventing jetting and formation of knit lines within the ceramic suspension. The ceramic suspension distends the elastomeric bladder until the mold cavity is filled. The ceramic suspension is then exposed to conditions sufficient to cause the injected ceramic suspension to form a molded ceramic greenware composite. The molded ceramic greenware composite can then be removed from the mold for drying and for debindering and densification to form a finished ceramic part.

20 Claims, 4 Drawing Sheets

METHOD OF INJECTION MOLDING CERAMIC GREENWARD COMPOSITES WITHOUT KNIT LINES

BACKGROUND OF THE INVENTION

Ceramic parts are commonly produced by injection of a ceramic suspension into a mold and then treated to form a molded ceramic greenware composite. The molded ceramic greenware composite is subsequently removed from the mold for further processing to form the finished ceramic part. Injection molding typically requires that the ceramic suspension be injected into a mold cavity having a cross-section which is larger than a conduit through which the ceramic suspension is delivered. The ceramic suspension is typically cohesive enough to form a stream during mold-filling which will break apart, or jet, and fold upon itself to form knit lines as it fills the mold cavity. The ceramic suspension often does not recombine intimately at these knit lines, which can thereby form structural flaws that limit the performance of the finished ceramic part.

A molded ceramic greenware composite that has been formed by injection molding is removed from the mold cavity for further processing to produce the finished ceramic part. When using certain binder systems, such as aqueous methylcellulose formulations, stresses caused by handling a rubbery gelled ceramic greenware composite can cause irregularities in the molded ceramic greenware composite after gellation of the methylcellulose. In addition, molded ceramic greenware composites prepared using these aqueous-based binder systems must be dried at a controlled rate to prevent formation of drying cracks before the molded ceramic greenware composite is further processed and densified. Molds also often cause seams to form in molded ceramic greenware composites which must be removed during finishing steps. Further, the mold cavity often must have a surface which is highly polished in order to produce a ceramic part having an acceptable finish. The ceramic suspension can also deleteriously affect the mold, such as by abrasive wear of a mold cavity wall, thereby limiting the usable life of the mold.

Thus, a need exists for an improved ceramic injection molding method and apparatus for forming molded ceramic greenware composites which overcome or minimize the aforementioned problems.

SUMMARY OF THE INVENTION

The present invention relates to a method and apparatus for injection molding a ceramic suspension to form a molded ceramic greenware composite.

A method for injection molding a ceramic suspension to form a molded ceramic greenware composite includes injecting the ceramic suspension into an elastomeric bladder disposed within a mold cavity defined by a mold, whereby the elastomeric bladder is distended by the ceramic suspension. The distention of the elastomeric bladder thereby causes the elastomeric bladder to apply a significant force to the ceramic suspension to prevent jetting of the ceramic suspension and formation of knit lines within the ceramic suspension. The injected ceramic suspension is exposed to conditions sufficient to form the molded ceramic greenware composite.

Apparatus for injection molding a ceramic suspension to form a molded ceramic greenware composite includes a mold defining a mold cavity and an elastomeric bladder disposed within the mold cavity for receiving the ceramic suspension. Means for injecting the ceramic suspension into the elastomeric bladder inject the ceramic suspension into the elastomeric bladder, whereby the elastomeric bladder is distended. Distention of the elastomeric bladder causes the elastomeric bladder to apply significant force to the ceramic suspension for preventing jetting of the ceramic suspension and formation of knit lines within the ceramic suspension. Means for exposing the injected ceramic suspension to conditions sufficient to form the molded ceramic greenware composite expose the injected ceramic suspension to conditions sufficient to form the molded ceramic greenware composite.

Molded ceramic greenware composites can thereby be formed from a ceramic suspension without jetting or formation of knit lines within the ceramic suspension. Finished molded ceramic parts are thus formed having substantially reduced numbers of structural flaws. Further, the molded ceramic greenware composites formed can be removed from the mold without adhesion of the molded ceramic greenware composite to the mold. In addition, the bladder adds stiffness to the molded ceramic greenware composite, thereby reducing distortion of the molded ceramic greenware composite. Also, because the finish of the molded ceramic greenware composite is not determined by the mold, a polish between the mold and molded ceramic greenware composite is not required. Elimination of contact between the molded ceramic greenware composite and the mold can also prolong the useful life of the mold.

DETAILED DESCRIPTION OF THE DRAWINGS

DETAILED DESCRIPTION OF THE INVENTION

The above features and other details of the method and apparatus of the invention will now be more particularly described with reference to the accompanying drawings and pointed out in the claims. The same number present in different FIGURES represents the same item. It will be understood that the particular embodiments of the invention are shown by way of illustration and not as limitations of the invention. The principle features of this invention may be employed in various embodiments without departing from the scope of the invention.

Figure 1:
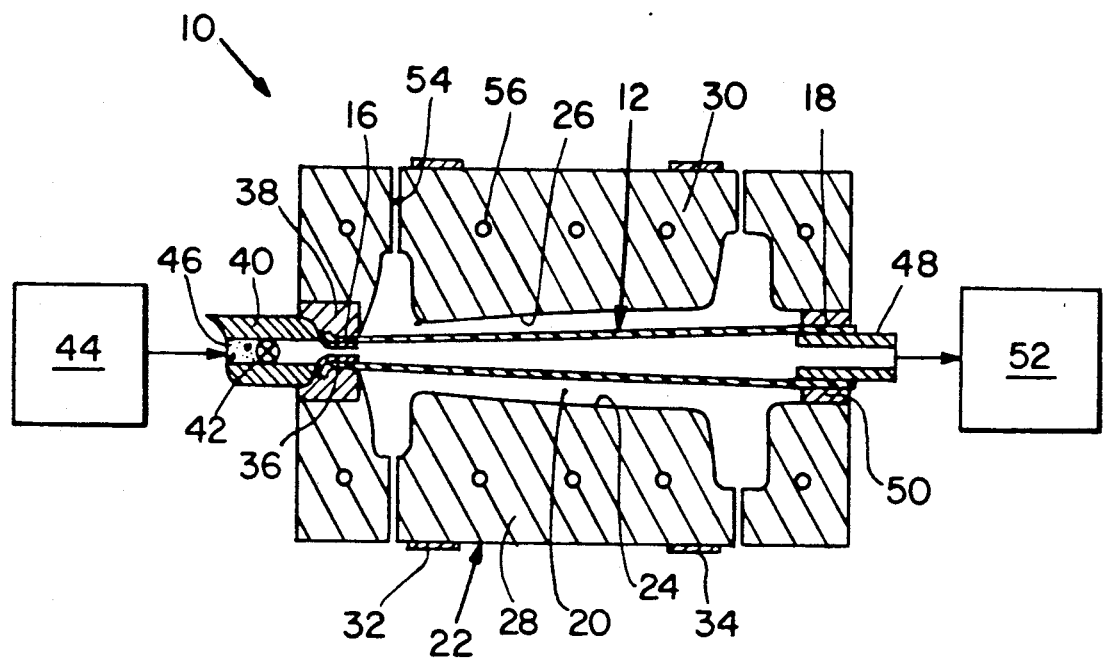
FIG. 1 is a section view of one embodiment of the invention wherein an elastomeric bladder is disposed in a relaxed state within a mold cavity defined by a mold.

In one preferred embodiment of the present invention, shown in FIG. 1, an injection molding apparatus 10 includes an elastomeric bladder 12 in a relaxed state. Elastomeric bladder 12 can be tubular in the relaxed state. Elastomeric bladder 12 has an inlet end 16 and an outlet end 18 and is disposed within a mold cavity 20 of mold 22. Mold cavity 20 is defined by mold cavity walls 24 and 26 of mold 22. Mold halves 28 and 30 of mold 22 are held in an assembled position, as shown in FIG. 1, by mold clamps 32 and 34. Inlet end 16 of elastomeric bladder 12 is supported between fill tube 36 and nozzle bushing 38. Fill tube 36 provides fluid communication between a nozzle 40 and elastomeric bladder 12. Valve 42 at nozzle 40 provides fluid communication between a ceramic suspension source 44 and fill tube 36, and regulates flow of a ceramic suspension 46 from ceramic suspension source 44 through nozzle 40 to elastomeric suspension source 44 through nozzle 40 to elastomeric bladder 12. Outlet end 18 of elastomeric bladder 12 is supported between a vacuum tube 48 and a split core 50. Vacuum tube 48 provides fluid communication between elastomeric bladder 12 and a vacuum source 52. Vents 54 provide fluid communication between mold cavity 20 and the atmosphere. A heat transfer fluid can be conducted through channels 56 in mold 22 to thereby control the temperature of ceramic suspension 46 introduced to elastomeric bladder 12.

Figure 2:
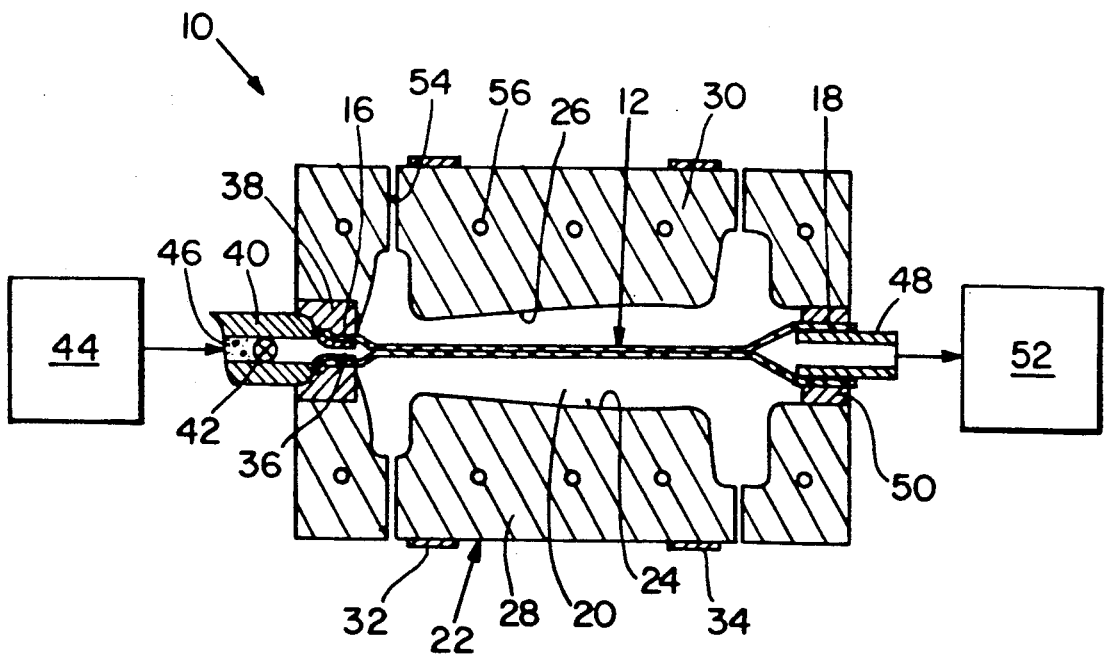
FIG. 2 is a section view of the embodiment of FIG. 1 wherein the elastomeric bladder has been evacuated.
Figure 3:
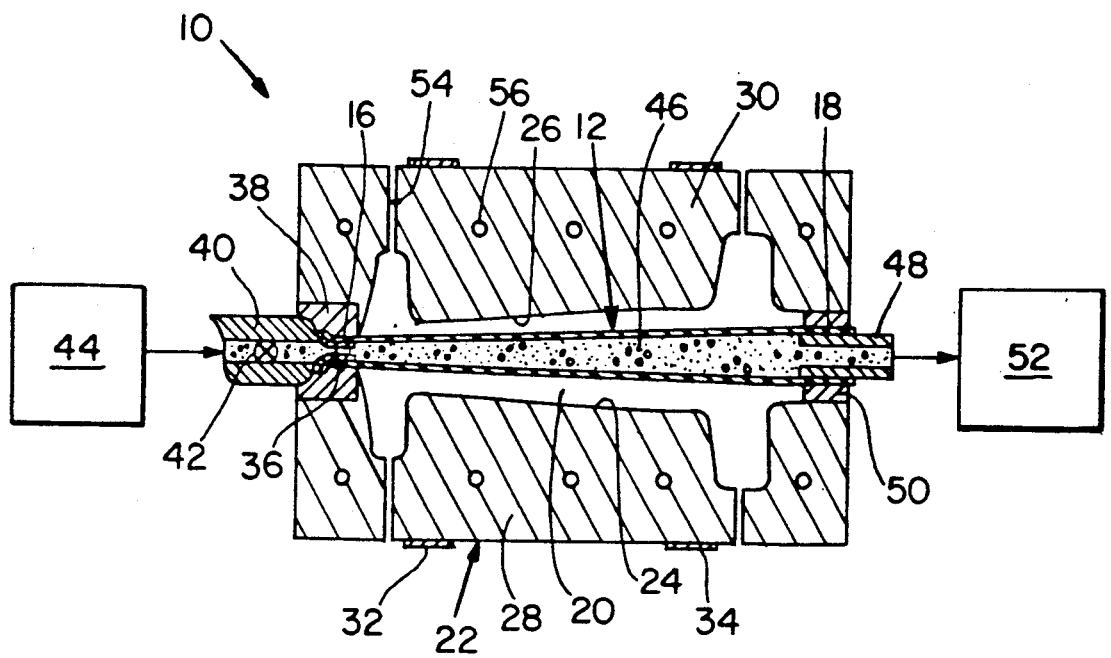
FIG. 3 is a section view of the embodiment of FIGS. 1 and 2 during injection of a ceramic suspension into the evacuated elastomeric bladder from a ceramic suspension source.
Figure 4:
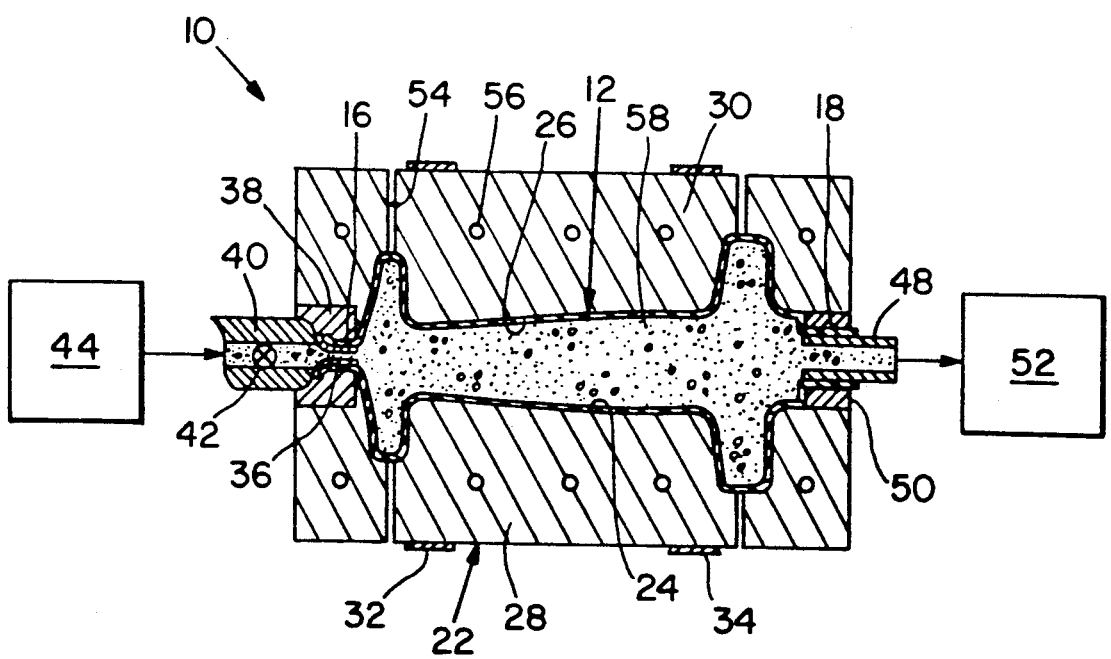
FIG. 4 is a section view of the embodiment of FIGS. 1–3 wherein the injected ceramic suspension has filled the mold cavity.

In a preferred embodiment, a method for injection molding a ceramic suspension to form a molded ceramic greenware composite includes disposing elastomeric bladder 12 within mold cavity 20 of mold 22, as shown in FIG. 1. Vacuum can be applied to evacuate elastomeric bladder 12 through vacuum tube 48 by vacuum source 52. Elastomeric bladder 12 thereby collapses, as can be seen in FIG. 2. Evacuation of elastomeric bladder 12 maximizes contact between elastomeric bladder 12 and ceramic suspension 46 and prevents development of air pockets within elastomeric bladder 12 during injection of ceramic suspension 46 into elastomeric bladder 12. As shown in FIG. 3, ceramic suspension 46 is injected into elastomeric bladder 12 through nozzle 40 and fill tube 36. Elastomeric bladder 12 is distended during injection of ceramic suspension 46. Distention of elastomeric bladder 12 causes elastomeric bladder 12 to apply a significant force to ceramic suspension 46 within elastomeric bladder 12, thereby preventing jetting of ceramic suspension 46 and formation of knit lines within ceramic suspension 46. Injection of ceramic suspension 46 into mold cavity 20 directs elastomeric bladder 12 against mold cavity walls 24 and 26. Ceramic suspension 46 is injected into mold cavity 20 until elastomeric bladder 12 and ceramic suspension 46 conform to mold cavity 20, as shown in FIG. 4. Air or other gas is displaced from mold cavity 20 through vents 54 by injection of ceramic suspension 46 into elastomeric bladder 12.

Continued injection of ceramic suspension 46 into elastomeric bladder 12 through fill tube 36 after mold cavity 20 is filled, will direct ceramic suspension 46 from elastomeric bladder 12 through vacuum tube 48. Valve 42 is closed upon filling of mold cavity 20 with ceramic suspension 46. Pressure within elastomeric bladder 12 during injection of ceramic suspension 46 is at least partially determined by the cross-sectional area of vacuum tube 48. For example, pressure within elastomeric bladder 12, when mold cavity 20 has been filled by ceramic suspension 46, can be increased by reducing the cross-sectional area of vacuum tube 48. Once mold cavity 20 has been filled, vacuum through vacuum tube 48 can be secured, either before or after valve 42 is closed. Vacuum can be secured by sealing vacuum tube 48 from vacuum source 52 by a suitable means, such as by closing a valve, not shown, or by terminating the vacuum source. The temperature of mold 22 and ceramic suspension 46 can be controlled by conducting a heat transfer fluid through channels 56.

Ceramic suspension 46 includes a ceramic powder and a binder system. The ceramic powder, as that term is used herein, can include, for example: ceramics, such as alumina, silicon carbide, silicon nitride, aluminum nitride, boron nitride, boron carbide and zirconia. Powders other than ceramic including cermets, such as chromium-alumina; powdered metals, such as ferrous-based alloys; etc. can be used in the disclosed process. The binder system includes a suitable binder and a suitable carrier. The binder can comprise, for example, an organic material, such as methylcellulose, wax, etc. The binder can also comprise a thermoplastic. Suitable carriers include water and organic solvents, such as methanol, methyl ethyl ketone, etc.

Elastomeric bladder 12 can be formed of polyurethane or other elastomeric material. Elastomeric bladder 12 can, in the alternative, be formed of an elastic material. In a preferred embodiment, elastomeric bladder 12 is formed of an elastomeric material which is relatively abrasion resistant, resilient and which exhibits high extensibility. An example of a suitable elastomeric material includes polyurethane, such as aromatic polyether polyurethane. In a preferred embodiment, the thickness of elastomeric bladder 12 is in the range of between about one mill ($2.54 \times 10^{-3}$ cm) and about ten mills ($25.4 \times 10^{-3}$ cm). Elastomeric bladder 12 is permeable by the selected carrier in the binder system of the ceramic suspension. In a particularly preferred embodiment, elastomeric bladder 12 has a thickness of about one mill ($2.54 \times 10^{-3}$ cm) and has a water vapor permeability of less than about one hundred and forty grams per twenty-four hours through a one hundred square inch matrix area at a temperature of about 50° C.

Mold 22 can be formed of a thermally conductive material, such as steel, aluminum, etc. The temperature of ceramic suspension 46 can be controlled in mold 22, for example, by conducting a suitable heat transfer fluid through channels 56 in mold 22. For a ceramic suspension 46 which includes an aqueous methylcellulose polymer binder system, the temperature of ceramic suspension 46 within elastomeric bladder 12 during injection is maintained in the range of between about 1° C. and about 25° C. Means for injection of ceramic suspension 46 from ceramic suspension source 44 can be, for example, a reciprocating screw, not shown. Ceramic suspension 46 can be heated within mold cavity 20 to gel the binder, whereby the binder comes out of solution to provide rigidity to ceramic suspension 46. Molded ceramic greenware composite 58 is thereby formed from ceramic suspension 46. Molded ceramic greenware composite 58 is sufficiently rigid for removal from mold cavity 20 without substantial distortion.

Where the binder is a thermoplastic, the temperature of ceramic suspension 46 within mold cavity 20 during injection can be maintained in the range of between about 30° C. and about 60° C. Means for injecting ceramic suspension 46 can be, for example, a plunger-type machine, not shown. Mold 22 can be cooled for cooling of ceramic suspension 46 to a temperature in the range of, for example, between about 1° C. and about 25° C. Ceramic suspension 46 thereby forms molded ceramic greenware composite 58, which is sufficiently rigid for removal from mold cavity 20 without substantial distortion.

In another preferred embodiment, mold 22 is formed of a microwave-transparent material. Examples of microwave-transparent materials include thermoplastics, such as polyetherimine (PEI) and thermosets, such as a polyurethane tooling resin system formed of, for example, a polymeric methylenediisocyanate solution and a polyol solution. Gellation of binder in ceramic suspension 46 can be achieved by application of microwave energy where, for example, ceramic suspension 46 includes an aqueous methylcellulose polymer binder system. Molded ceramic greenware composite 58 can thereby be formed from ceramic suspension 46 by application of microwave energy to ceramic suspension 46. Molded ceramic greenware composite 58 is sufficiently rigid for removal from mold cavity 20 without substantial distortion.

Figure 5:
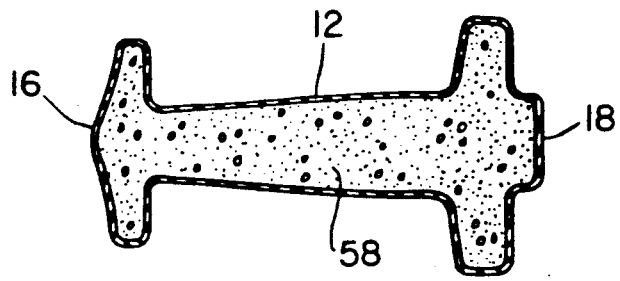
FIG. 5 is a side view of the elastomeric bladder of FIGS. 1–4 containing a molded ceramic greenware composite formed from the injected ceramic suspension. The elastomeric bladder is sealed at an inlet end and at an outlet end for drying of the molded ceramic greenware composite.

Molded ceramic greenware composite 58 and elastomeric bladder 12 are then removed from mold cavity 20 by releasing mold clamps 32 and 34 and disassembling mold halves 28 and 30. Elastomeric bladder 12 is sealed at inlet end 16 and outlet end 18. Inlet end 16 and outlet end 18 of elastomeric bladder 12 are sealed, as shown in FIG. 5, by heat-sealing, or by another suitable method. Heat sealing can be accomplished by squeezing inlet end 16 and outlet end 18 between bars, not shown, which are sufficiently hot to soften elastomeric bladder 12 and seal inlet end 16 and outlet end 18.

Molded ceramic greenware composite 58 is then dried by a suitable method, such as by disposing molded ceramic greenware composite 58 in a suitable oven, not shown. The carrier is volatilized in the oven and transported across elastomeric bladder 12, thereby drying molded ceramic greenware composite 58 to form a dried, molded ceramic greenware composite. For example, where the binder system is an aqueous methylcellulose polymer binder system, molded ceramic greenware composite 58 within elastomeric bladder 12 elastomeric bladder 12 can be dried at a temperature of between about 30° C. and about 70° C. Elastomeric bladder 12 is then removed from the dried, molded ceramic greenware composite 58. A finished, molded ceramic part is then formed by suitably debindering the dried, molded ceramic greenware composite and then densifying the debindered, molded ceramic greenware composite by a suitable method, e.g., sintering.

Figure 6:
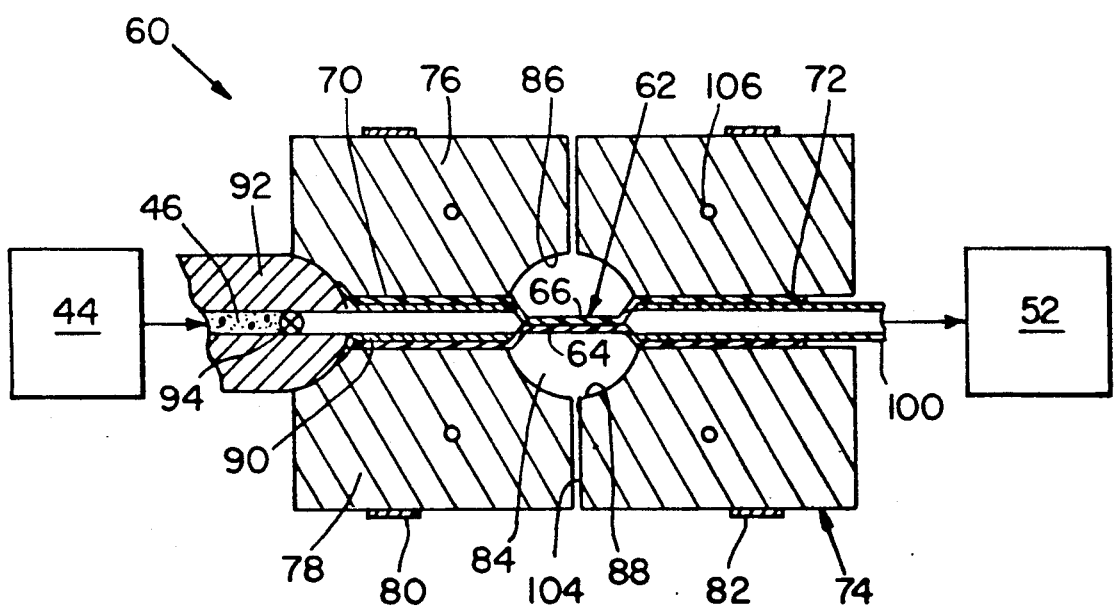
FIG. 6 is a section view of a second embodiment of the present invention wherein the elastomeric bladder is formed of two sheets of material disposed within a mold cavity defined by a mold and wherein the elastomeric bladder is supported within the mold cavity at an inlet end and an outlet end of the elastomeric bladder.

In another preferred embodiment of the present invention, shown in FIG. 6, an injection molding apparatus 60 has an elastomeric bladder 62 which can be formed by sheets 64 and 66. Elastomeric bladder 62 also has an inlet end 70 and an outlet end 72. Sheets 64 and 66 are supported within mold 74 between mold halves 76 and 78.

Elastomeric bladder 62 can be formed of a material which is permeable to water moisture vapor. In a preferred embodiment, the material has a thickness of between about one mill and about ten mills. In a particularly preferred embodiment, the material has a permeability to water vapor of less than about one hundred and forty grams per twenty-four hours through a one hundred square inch (645 cm$^2$) surface area at a temperature of about 50° C. An example of a suitable material is a polyurethane, such as an aromatic polyether polyurethane.

Mold 74 is maintained in an assembled condition by mold clamps 80 and 82. Elastomeric bladder 62 is disposed within mold cavity 84, which is defined by mold cavity walls 86 and 88 of mold halves 76 and 78, respectively. Mold 74 can be formed of a thermally conductive material, such as steel, for example, or of a microwave-transparent material. One example of a suitable microwave-transparent material is polyetherimide. Another example is a polyurethane tooling resin, such as a polyurethane tooling resin system formed from a polymeric methylenediisocyanate solution and a polyol solution.

Inlet end 70 of elastomeric bladder 62 is supported between fill tube 90 and mold halves 76 and 78. Fill tube 90 provides fluid communication between a nozzle 92 and elastomeric bladder 62. A valve 94 at nozzle 92 provides fluid communication between a ceramic suspension source 44 and elastomeric bladder 62, and can regulate the flow of ceramic suspension 46 from ceramic suspension source 44 into elastomeric bladder 62. Outlet end 72 is supported between a vacuum tube 100 and mold halves 76 and 78. Vacuum tube 100 provides fluid communication between elastomeric bladder 62 and vacuum source 52. Vents 104 provide fluid communication between mold cavity 84 and the atmosphere. A heat transfer fluid can be conducted through channels 106 for controlling the temperatures of mold 74 and of ceramic suspension 46 within elastomeric bladder 62.

Figure 7:
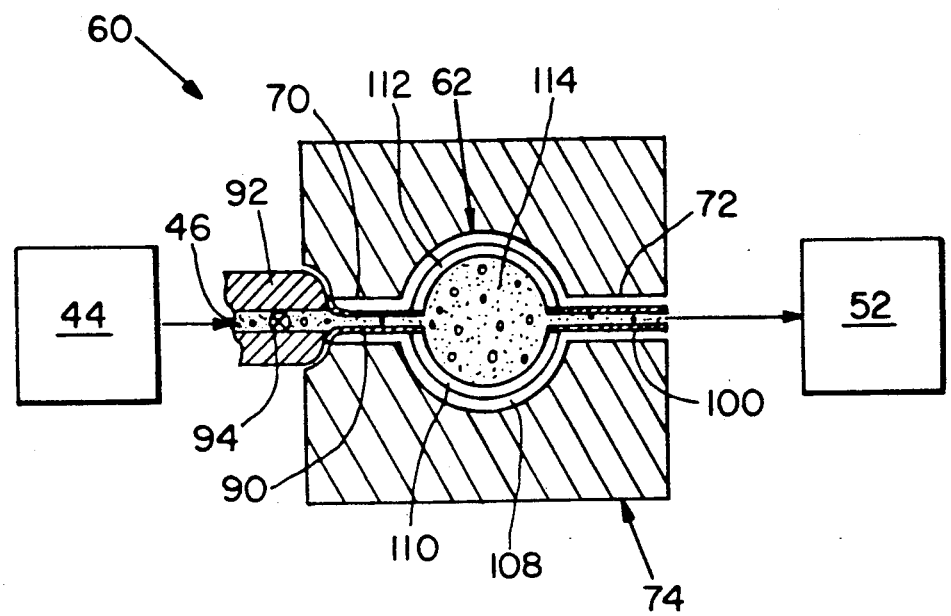
FIG. 7 is a plan view of the embodiment of FIG. 6 illustrating a peripheral seal of the elastomeric bladder and a flange disposed about the elastomeric bladder.

Sheets 64 and 66 can be bonded together to form a peripheral seal 108, shown in FIG. 7, by heat-sealing or by some other conventional method. Flange halves 110 and 112 can be disposed about peripheral seal 108 of elastomeric bladder 62 for preventing puckering of elastomeric bladder 62 during injection from a ceramic suspension source 44 of a ceramic suspension 46 into elastomeric bladder 62.

Figure 8:
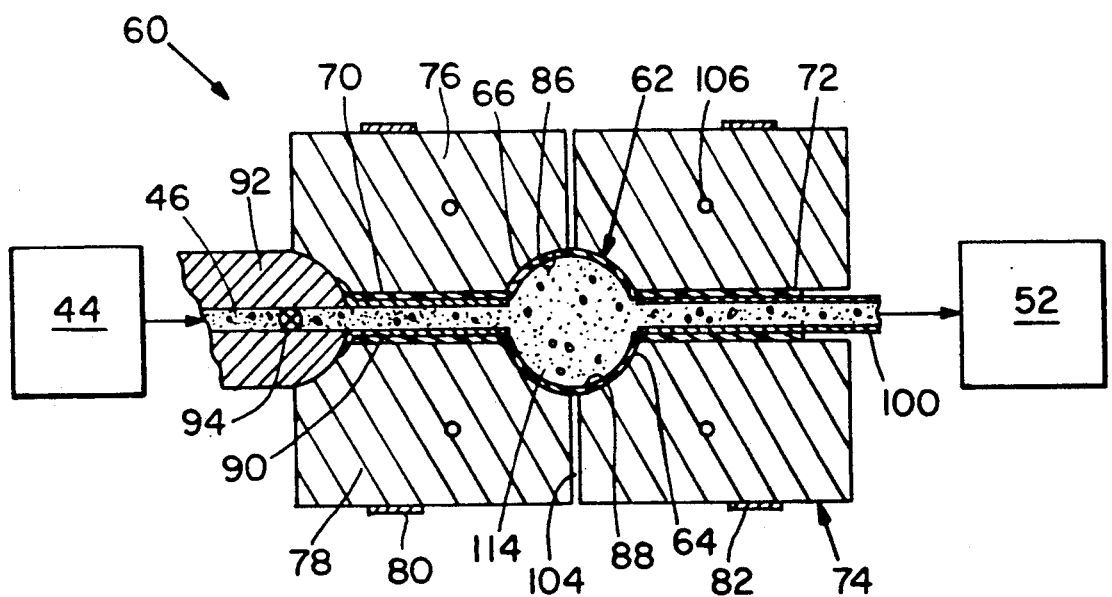
FIG. 8 is a section view of the embodiment of FIGS. 6 and 7 during injection of a ceramic suspension into the elastomeric bladder.

In a preferred embodiment, a method of injection molding a ceramic suspension to form a molded ceramic greenware composite includes drawing vacuum within elastomeric bladder 62 through vacuum tube 100 by vacuum source 52. Evacuation causes collapse of elastomeric bladder 62, as seen in FIG. 6, to thereby maximize contact between elastomeric bladder 62 and ceramic suspension 46 during injection of ceramic suspension 46. Ceramic suspension 46 is injected from ceramic suspension source 44 through nozzle 92 and fill tube 90 into elastomeric bladder 62, thereby distending elastomeric bladder 62, as shown in FIG. 8.

As elastomeric bladder 62 is distended, a significant force is applied by elastomeric bladder 62 to ceramic suspension 46 within elastomeric bladder 62, thereby preventing jetting of ceramic suspension 46 and formation of knit lines within ceramic suspension 46. Air or other gas within mold cavity 84 of mold 74 is displaced by elastomeric bladder 62 and ceramic suspension 46 through vents 104. Continued distention of elastomeric bladder 62 by injection of ceramic suspension 46 directs elastomeric bladder 62 against mold cavity wall 86. Elastomeric bladder 62 and ceramic suspension 46 within elastomeric bladder 62 thereby conform to mold cavity walls 86 and 88.

Ceramic suspension 46 is directed through vacuum tube 100 when mold cavity 84 has been filled. Pressure within elastomeric bladder 62 is at least partially limited by the cross sectional area of vacuum tube 100. When ceramic suspension 46 has filled mold cavity 84, valve 94 is closed to secure flow of ceramic suspension 46 into elastomeric bladder 62. Once mold cavity 84 has been filled, vacuum through vacuum tube 100 can be secured either before or after valve 94 is closed. Vacuum can be secured by sealing vacuum tube 100 from vacuum source 52 by a suitable means, such as by a valve, not shown, or by terminating the vacuum source. Nozzle 92 is then disconnected from fill tube 90 and elastomeric bladder 62. Vacuum tube 100 is disconnected from vacuum source 52.

Ceramic suspension 46 is then exposed to conditions sufficient to form molded ceramic greenware composite 114, such as is described for formation of molded ceramic greenware composite 58 in the embodiment illustrated in FIG. 5. Molded ceramic greenware composite 114 can then be removed from mold 74. Inlet end 70 and outlet end 72 of elastomeric bladder 62 can then be sealed by a suitable method, such as heat sealing. Molded ceramic greenware composite 114 within elastomeric bladder 62 can then be dried by sufficiently heating molded ceramic greenware composite 114 to cause moisture within molded ceramic greenware composite 114 to volatilize and thereby be transported across elastomeric bladder 62. Flange halves 110 and 112 and elastomeric bladder 62 are then removed from dried molded ceramic greenware composite 114. Puckering of elastomeric bladder 62 at flange halves 110 and 112 can be trimmed from dried molded ceramic greenware composite 114 during removal of elastomeric bladder 62 from dried molded ceramic greenware part 114. Dried molded ceramic greenware composite 114 can then be debindered and densified to form a finished molded ceramic part.

EQUIVALENTS

Those skilled in the art will recognize, or be able to ascertain using no more than routine experimentation, many equivalents to the specific embodiment of the invention described specifically herein. Such equivalents are intended to be encompassed in the scope of the following claims.

We claim:

1. A method for injection molding a powder suspension which includes a binder system, formed of a binder and a carrier, and a powder selected from the group consisting of ceramics, metals and cermets, to form a molded powder greenware composite, comprising the steps of:
   (a) injecting the powder suspension into an elastomeric bladder disposed within a mold cavity defined by a mold, whereby the elastomeric bladder is distended by the powder suspension, distention of the elastomeric bladder thereby causing the elastomeric bladder to apply a significant force to the powder suspension to prevent jetting of the powder suspension and formation of knit lines within the powder suspension; and
   (b) exposing the injected powder suspension to conditions sufficient to form the molded powder greenware composite.

2. A method of claim 1 wherein the elastomeric bladder comprises polyurethane.

3. A method of claim 2 wherein the polyurethane comprises an aromatic polyether polyurethane.

4. A method of claim 1 further comprising the step of evacuating the elastomeric bladder prior to injecting the ceramic suspension into the elastomeric bladder.

5. A method of claim 1 whereby the powder suspension comprises a ceramic powder and a binder system, wherein the binder system includes a binder and carrier for preparation of a ceramic suspension and molded ceramic greenware composite.

6. A method of claim 5 further comprising the steps of removing the elastomeric bladder containing the molded ceramic greenware composite from the mold cavity, sealing the elastomeric bladder and then disposing the elastomeric bladder and the molded ceramic greenware composite in an oven, whereby the carrier is volatilized and permeates the elastomeric bladder for drying the molded ceramic greenware composite.

7. A method of claim 6 wherein the carrier comprises water.

8. A method of claim 7 wherein the volatilized water permeates the elastomeric bladder at a rate of less than about one hundred and forty grams per twenty-four hours through a one hundred square inch matrix area having a thickness of about one mil when the temperature of the carrier is about 50° C.

9. A method of claim 8 further comprising the step of maintaining the temperature of the mold cavity in the range of between about 30° C. and about 60° C. during injection of the ceramic suspension into the elastomeric bladder.

10. A method of claim 9 further comprising the step of cooling the ceramic suspension in the mold cavity to a temperature in the range of between about 1° C. and about 25° C. after injection of the ceramic suspension to cause the binder to solidify, thereby causing the ceramic suspension to form a molded ceramic greenware composite.

11. A method of claim 10 further comprising the steps of removing the elastomeric bladder from the dried, molded ceramic greenware composite and then debindering and densifying the dried, molded ceramic greenware composite to form a finished ceramic part.

12. A method of claim 11 wherein the binder comprises a thermoplastic.

13. A method of claim 6 further comprising the step of maintaining the temperature of the mold cavity in the range of between about 1° C. and about 25° C. during injection of the ceramic suspension into the elastomeric bladder.

14. A method of claim 13 further comprising the step of introducing microwave energy to the mold cavity and to the molded greenware part within the mold cavity, thereby causing the binder to form a gel.

15. A method of claim 14 wherein the binder comprises methylcellulose.

16. A method of claim 13 further comprising the step of heating the ceramic suspension in the molding cavity to a temperature in the range of between about 30° C. and about 60° C. after injection of the ceramic suspension for a period of time sufficient to cause the binder to form a gel, thereby causing the ceramic suspension to form a molded ceramic greenware composite.

17. A method of claim 16 further comprising the steps of removing the elastomeric bladder containing the molded part from the mold cavity, sealing the elastomeric bladder and then disposing the elastomeric bladder and the molded ceramic greenware composite in an oven whereby the carrier within the molded ceramic greenware suspension is volatilized and conducted across the elastomeric bladder for drying of the molded ceramic greenware composite.

18. A method of claim 17 wherein the carrier comprises an organic solvent.

19. A method of claim 17 wherein the carrier comprises water.

20. A method of claim 19 wherein the binder comprises methylcellulose.

* * * * *